Feb. 3, 1970 S. ARASE 3,493,867

POWER CONTROL CIRCUIT

Filed July 3, 1967

SHINGO ARASE
INVENTOR

BY Lyon & Lyon
ATTORNEYS 3,493,867
POWER CONTROL CIRCUIT

Shingo Arase, Monterey Park, Calif., assignor to Hoffman Electronics Corporation, El Monte, Calif., a corporation of California Filed July 3, 1967, Ser. No. 650,908
Int. Cl. H04b *1/04*
U.S. Cl. 325—159 1 Claim

ABSTRACT OF THE DISCLOSURE

A power control circuit for providing a substantially constant peak radio frequency power output throughout a range of frequencies. A power amplifier is driven by a modulator which receives a controlled voltage from a voltage regulator. The power amplifier output, which is supplied to an RF monitor and then to an antenna or the like, is detected and employed to control the voltage output of the voltage regulator.

Figure 1:
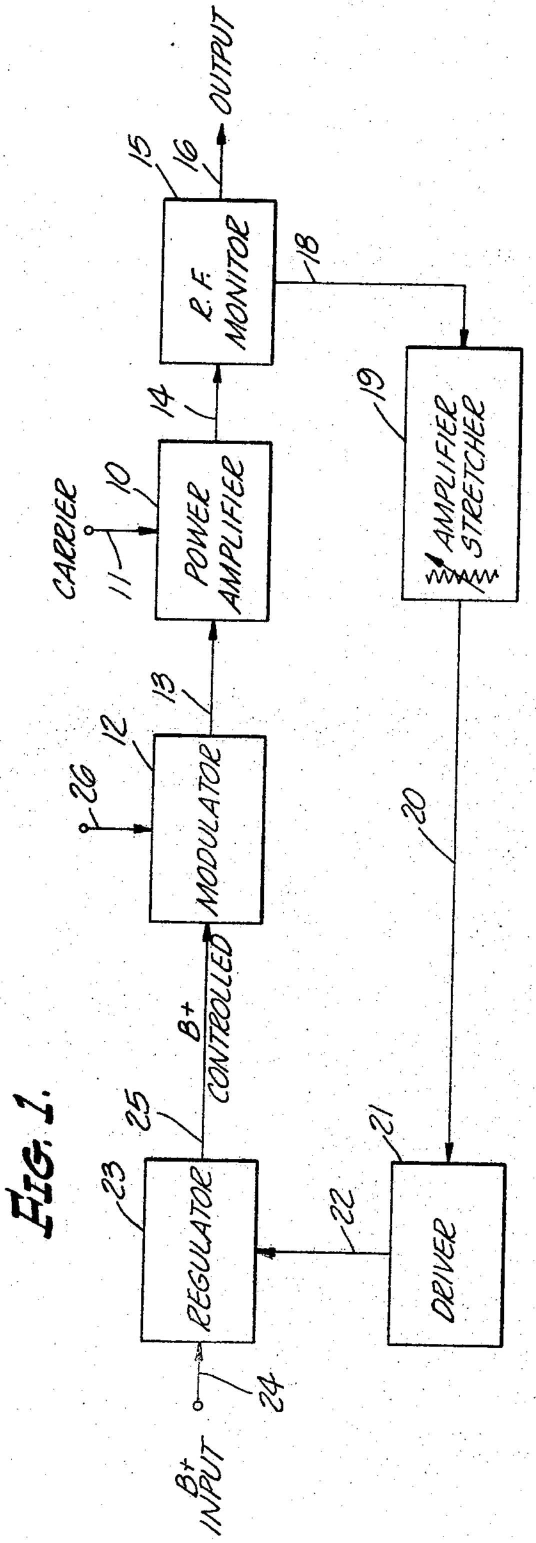

This invention relates to a power amplification and more particularly to a power control circuit for radio frequency power amplification to provide a substantially constant peak power output over a range of frequencies.

In some instances where broadband power amplifiers are employed, for example some microwave applications, the amplifier is not tuned to a specific frequency. Accordingly, if the frequency is changed, the peak power magnitude varies. Accordingly, it is an object of the present invention to provide a power control circuit for enabling a substantially constant peak radio frequency power output to be maintained over a desired frequency band.

It is an additional object of this invention to provide a power control circuit for enabling peak radio frequency power output to be maintained substantially constant over a desired frequency band.

It is a further object of this invention to provide a radio frequency power amplification system employing feedback for enabling the radio frequency power output to be maintained relatively constant over a desired frequency band.

Figure 2:
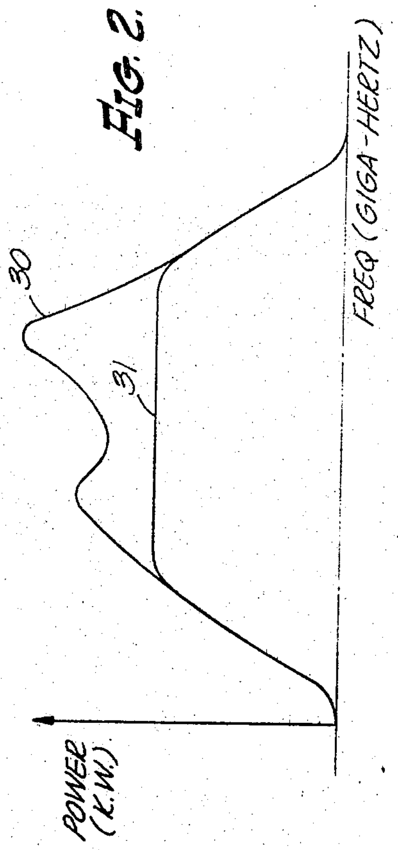

These and other objects and features of the invention will become apparent through a consideration of the following description taken in conjunction with the drawing in which:

FIGURE 1 is a block diagram of a power control circuit according to the present invention; and FIGURE 2 is an exemplary diagram illustrating output power with and without control thereof.

In accordance with the principles of the present invention, a power amplifier is driven by signals from a modulator which receives a controlled voltage input from a voltage regulator. The amplitude of the radio frequency (RF) output from the power amplifier is detected and employed to control the output voltage of the voltage regulator.

Turning now to the drawing, a power amplifier 10 having an RF carrier wave input 11 is modulated by a modulator 12. The modulator 12 supplies high voltage video pulses along a line 13 to the power amplifier 10 to modulate the carrier wave. These video pulses are employed for plate modulation of the vacuum tubes in the power amplifier 10. The output of the power amplifier 10 is supplied to a line 14 to which an RF monitor 15 is coupled. The output of the RF monitor 15 is supplied through a line 16 to an antenna, or through a circulator to an antenna. The RF monitor 15 is a detector which detects the amplitude of the modulated RF signal, and a simple diode detector may be employed.

The output of the RF monitor 15 is supplied through a line 18 to an amplifier stretcher 19, which in turn supplies an output along a line 20 to a driver amplifier 21. The amplifier stretcher 19 has a long time constant and essentially stretches the input pulse to the line 20 and provides a long output pulse which is essentially D.C. voltage compared to the pulse duration on the line 18. For example, if the pulse amplitude on the line 18 is two volts and the pulse is three micro-seconds wide, the amplifier stretcher 19 may provide a two volt pulse one second wide. However, since many additional pulses will occur within this one second period, the output will be essentially a D.C. voltage. Pulses of this nature typically may be encountered if the circuit of the present invention were employed in a radio air navigation system, such as a TACAN (tactical air navigation) system.

The D.C. voltage on the line 20 is amplified by the driver amplifier 21 and applied through a line 22 to control the voltage output of a voltage regulator 23. The voltage regulator 23 receives a constant input B+ voltage on a line 24 and provides a controlled B+ voltage output on a line 25. The driver amplifier 21 may, for example, amplify the two volt input pulse on the line 20 and supply a two-hundred volt output D.C. on the line 22.

Another input to the modulator 12 is applied through a line 26, and this input is a trigger input which may be a standard clock frequency input. Alternatively, trigger pulses may be applied through the line 26 to provide synchronization between the power control circuit of FIGURE 1 and external equipment. For example, the present power control circuit may be employed in conjunction with the range measuring system, or range computer, of a TACAN system with the interrogation pulses of the computer applied to the line 26. An example range measuring system, or range computer, with which the present power control circuit may be employed is disclosed in copending U.S. patent application Ser. No. 557,559, entitled "Digital Delay Measurement System," filed June 14, 1966, the disclosure of which is incorporated herein by reference. The modulator 12, as noted previously, provides high voltage pulses to modulate the power amplifier 10. Thus, it will be apparent that the peak power output of the amplifier 10 is maintained relatively constant over a desired frequency band by varying the power input to the amplifier 10.

FIGURE 2 illustrates an example of RF output with and without control thereof according to the present invention. A curve 30 illustrates a plot of output power versus frequency without control, and a curve 31 illustrates a plot of power versus frequency resulting from use of the concepts of the present invention. As is apparent from the curve 31, high power output may occur at several different frequencies. Such high power outputs may exceed power ratings or specifications of associated equipment. The typical power involved in a TACAN system, for example, may range up to three kilowatts, and a typical frequency range for the substantially flat portion of the curve 31 may range between 1.025 and 1.150 gigahertz. The gain of the amplifier stretcher 19 may be varied, such as manually by a potentiometer, to set the desired peak power level, e.g., one, two or three kilowatts.

The present embodiment of this invention is to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. In a radio navigation system wherein radio frequency signals are transmitted and received enabling computation of position, said system including a computer, the improvement comprising a power control circuit for providing radio frequency output signals having a substantially constant amplitude throughout a given high frequency band comprising RF power amplifier means having a control input for receiving driving signals, said amplifier means having a carrier signal input and having an output for providing RF output pulses to an antenna of said system, RF detector means coupled with the output of said amplifier means for detecting the amplitude of said output pulses, amplifier stretcher means coupled with said detector means and responsive to the output pulses of said detector means for esesntially stretching each said pulse into a pulse of substantially longer duration to provide an output control signal the amplitude of which is a function of the output pulses of said detector means, said amplifier stretcher means having a relatively long time constant and providing essentially a DC voltage output control signal in response to periodic pulses from said detector means, driver means coupled to the output of said amplifier stretcher means for amplifying the output control signal thereof to provide an amplified output control signal, voltage regulator means coupled with said driver means and responsive to said amplified output control signal thereof for providing a controlled output voltage, and modulator means coupled with the output of said regulator means and with said control input of said power amplifier means, said modulator means having a trigger input for receiving interrogation pulses from said computer and being responsive to the output from said regulator means and said interrogation pulses for supplying said driving signals to said amplifier means.

References Cited

FOREIGN PATENTS 104,666 8/1938 Australia.

ROBERT L. GRIFFIN, Primary Examiner

ALBERT J. MAYER, Assistant Examiner

U.S. Cl. X.R.

325—186, 187